Sept. 30, 1969     F. W. WRIGHT ET AL     3,469,626
PLATE HEAT EXCHANGERS

Filed Jan. 15, 1968     5 Sheets-Sheet 1

INVENTOR
FELIX W. WRIGHT. ETAL.
BY
ATTORNEYS

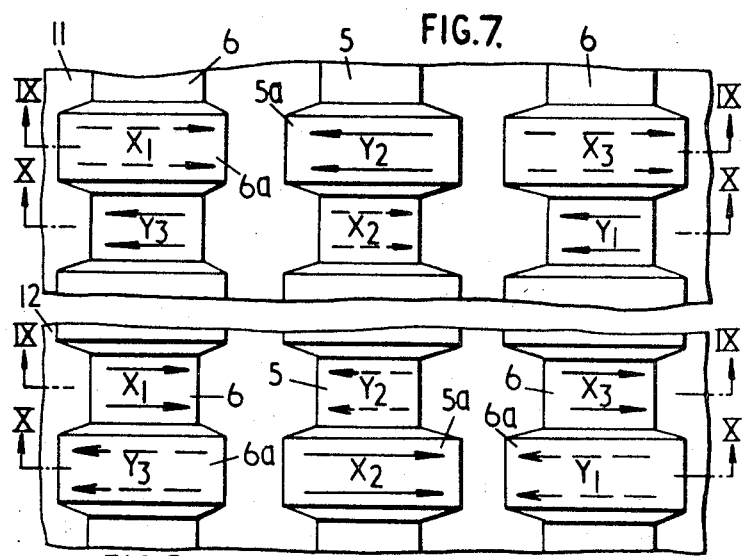
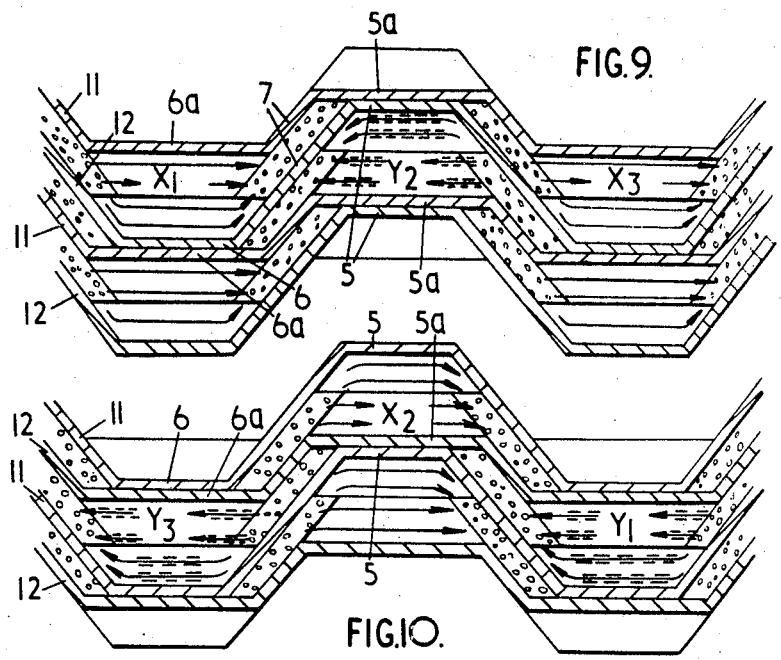

INVENTOR
FELIX W. WRIGHT. ET.AL.

United States Patent Office 3,469,626
Patented Sept. 30, 1969

3,469,626
PLATE HEAT EXCHANGERS
Felix William Wright, Copthorne Bank, near Crawley, and Alan Herbert Wilson, Redhill, England, assignors to The A.P.V. Company Limited, Crawley, England, a British company
Filed Jan. 15, 1968, Ser. No. 697,802
Claims priority, application Great Britain, Jan. 19, 1967, 2,902/67; July 31, 1967, 35,026/67
Int. Cl. F28f 3/00
U.S. Cl. 165—166                                15 Claims

ABSTRACT OF THE DISCLOSURE

A heat exchanger of the type built up from corrugated plates has the flow continually subdivided and recombined by means of elongated flow restrictions spaced along the corrugations. The restrictions are formed by localised elongated zones of reduction in height or depth of the corrugations which co-operate with the normal height or depth of the corrugations in the adjacent plates to form the restrictions.

---

This invention relates to plate heat exchangers.

In plate heat exchangers the transfer of heat from one medium to another occurs as a continuous process, the two media flowing in substantially parallel passages which are defined by a number of plates assembled in a face-to-face relationship. The plates are constructed such that there is provision for the entry and exit of the media to and from the spaces formed by this plate relationship. The plates are provided with generally peripheral gaskets which operate between the plates' faces to define the individual flow spaces and the relevant entries and exits. The plates are normally provided with undulations arranged within the area contained by the gasket and those undulations may be inter-mating, in which case inter-plate support to withstand the operating pressure of the media can be provided by local depressions positioned to allow contact between the plates when assembled. In such plates, change of direction of the media flow with localised expansion and contraction is arranged by the formation of the undulations whilst the overall direction of flow between the entry and exit is parallel to the plate surface.

At both surfaces of each plate there is a film, or boundary layer of the medium which tends to resist the transfer of heat from one medium to the other through the plate.

It is an object of the invention to provide a plate construction in which the boundary layer is disturbed, and the heat transfer thus improved.

In one known form of plate, small depressions extend downwardly from the crests and upwardly from the troughs for purposes of inter-plate support, but these do not have any significant effect on the flow regime.

The present invention consists in a plate heat exchanger comprising a pack of plates assembled in face-to-face relationship and having peripheral gaskets defining flow spaces between the plates for the passage of fluid heat exchanger media, in which each plate is formed with closely spaced corrugations having crests, troughs and flanks extending generally transversely of the overall flow direction, the corrugations in adjacent plates being parallel and intermating to provide an undulating flow path in any flow space, and wherein the crests and troughs are locally reduced in height and depth over zones elongated along the corrugations, so as to co-operate with the crests and troughs of the adjacent plates to present, at locations spaced along the corrugations, localised elongated restrictions to flow across the corrugations, the restrictions formed on any crest or trough being aligned along the plate with free flow zones formed on the adjacent troughs or crests between the restrictions on the said adjacent troughs or crests.

The reduction may be such that the adjacent plates contact one another to provide a localised complete restriction.

The invention further consists in a plate heat exchanger comprising a pack of plates assembled in face-to-face relationship and having peripheral gaskets defining flow spaces between the plates for the passage of fluid heat exchange media, in which each plate is formed with closely spaced corrugations having crests and troughs extending generally transversely of the overall flow direction, at least some of the crests and/or troughs of at least some of the plates being locally inclined across the corrugation over at least part of their lengths so as to extend towards one adjacent plate and away from the other adjacent plate to define therewith local flow path portions of varying cross-section, the flanks of the corrugation being parallel and presenting flow paths of uniform cross-section, the flanks at the high sides of crests and low sides of troughs extending close to the adjacent plate to restrict flow at the end of the path of uniform cross-section.

In plate forms where localised obstructions, partial or complete, are offered to the flow, the stream tends to subdivide and reunite successively, and this is the effect of the plate forms according to the invention and of other forms of plate which are currently available. This effect is achieved in conjunction with the disturbance of boundary layer flows in the construction according to the present invention, and a high rate of heat transfer is obtained.

Preferably, each crest or trough is formed with local inclinations in each direction, alternating along the corrugations.

Conveniently, each portion of a crest or trough adjacent an inclined portion in an adjacent plate, is itself inclined in the opposite sense so as to accentuate the variation in cross-section.

The invention will be further described with reference to the accompanying drawings of various embodiments of the invention, given by way of example only and not by way of limitation.

In the drawings:

FIGURES 7 and 8 are elevations of parts of two adjacent plates in a heat exchanger according to another form of the invention;

FIGURES 9 and 10 are sections along the lines IX—IX and X—X of FIGURES 7 and 8, assuming that these are superposed;

Figure 1:
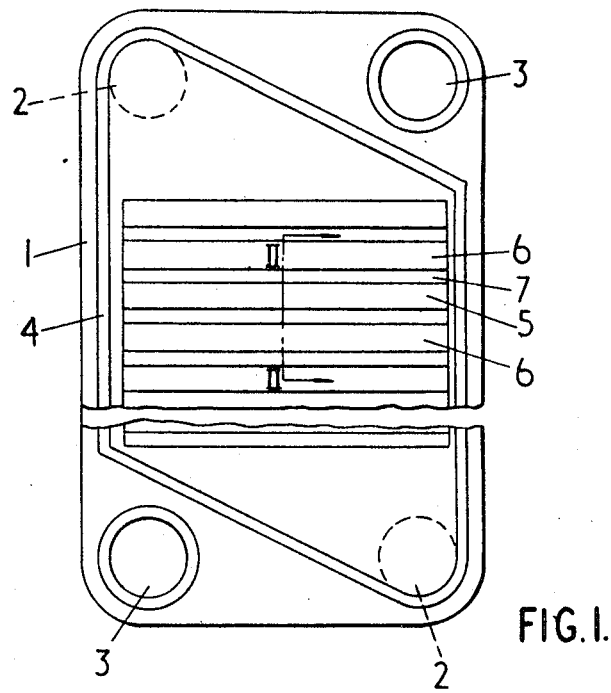
FIGURE 1 is a diagrammatic elevation of a conventional heat exchanger plate.

FIGURE 1 shows a plate 1 with exit and entry ports 2 for one fluid medium and gasketed through ports 3 for the other fluid medium. A peripheral gasket 4 defines a flow space for one medium. The plate 1 is provided with transverse corrugations having crests 5 and trough 6 joined by plane section flanks 7, as shown also in FIGURE 2.

Alternate plates in the pack are arranged so that their ports 2 align with the ports 3 of the plate illustrated.

Figure 6:
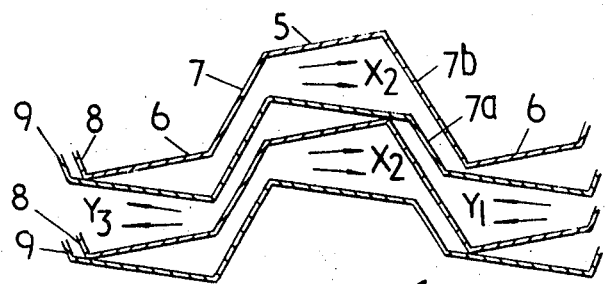
FIGURE 6 is a similar section on the line VI—VI of FIGURE 3.

According to the present invention, the crests 5 and troughs 6 are of a form different from that shown in FIGURE 2 and one form of the invention will now be described in detail with reference to FIGURES 3 and 6.

As may be seen from these figures, the troughs (or roots) 6 and crests 5 are arranged with alternating zones converging on or diverging from the adjacent plates to provide alternate restrictions and free flow zones. This is achieved by shortening and lengthening the flanks 7 as shown at 7a and 7b on alternate plate portions. By this means the flow space cross-section is locally alternately expanded and contracted and the fluid medium caused to flow laterally as well as across the corrugations in the normal flow directions.

Figure 3:
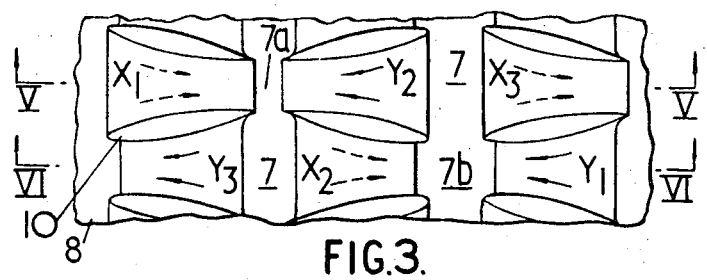
FIGURE 3 is an elevation of part of a plate according to one form of the invention.
Figure 4:
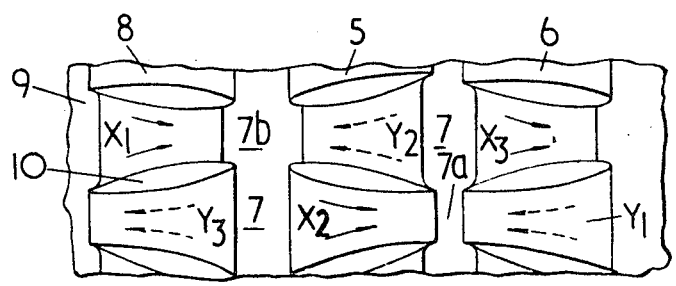
FIGURE 4 is a view similar to FIGURE 3 of a plate to be assembled with the plate of FIGURE 3.
Figure 5:
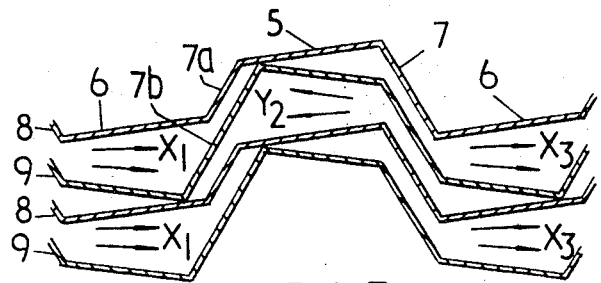
FIGURE 5 is a section on the line V—V of FIGURE 3 assuming that two plates are superposed.

FIGURE 3 shows one type of plate 8, which is alternated through the pack with plates 9 of another type as shown in FIGURE 4.

As may be seen from the drawings, the fluid medium above plates 9 flows generally from left to right of the drawings as indicated by arrows $X_1$, $X_2$, and $X_3$ and the fluid above plates 8 flows in the opposite direction as illustrated by arrows $Y_1$, $Y_2$ and $Y_3$.

The expanding flow paths $X_1$ in any trough each terminate in a fixed cross-section flow path between flanks 7a, 7b and this terminates when the flank 7b reaches close to or touching the crest 5. The flow between the flanks 7a and 7b is thus largely transversely of the plate into the adjacent $X_2$ expanding flow paths across the crest of the corrugation. Each flow path $X_2$ similarly terminates between parallel ribs 7a, 7b and the fluid flow is divided between the adjacent $X_3$ flow paths, identical with the $X_1$ paths, in the succeeding trough. The flow paths formed by the inclined crests and troughs are also defined by wall portions such as 10 which converge in the direction of flow so that the flow velocity is largely maintained and the flow is directed against the flanks 7b to increase turbulence and to disturb the boundary layer on each side of each flank 7b. This improves heat transfer. The flow for the other fluid, as indicated by the arrows $Y_1$, $Y_2$ and $Y_3$ is similar to that described in respect of the arrows $X_1$, $X_2$ and $X_3$.

It is to be understood that by slight changes to the geometry the flows on either side of a plate may be directed in a dissimilar manner.

As may be seen from FIGURES 7 to 10, in another form of embodiment of the invention, the crests 5 and troughs 6 are provided with localized portions of reduced height and depth respectively and indicated by the references 5a and 6a. FIGURE 7 shows alternate plates 11 of the pack, and FIGURE 8 shows the form of the intervening plates 12. These are, in effect, identical, and it is in their relative location to provide cooperation between the reduced height and depth portions 5a and 6a and the normal contours of the crests 5 and troughs 6 that the interest particularly lies. From a study of the section lines IX—IX and X—X it will be seen that the portions of reduced height and depth are located in juxtaposition to the normal contours of the crests and troughs in the intervening plates. As illustrated in FIGURES 9 and 10, the choice of the reduction is such that the reduced portions actually contact the normal contour portions so as to provide localized flow restrictions spaced along the troughs and crests.

Thus, in FIGURE 9, the plates 12 are shown on their normal contour while the intervening plates 11 have their crests and troughs reduced, while the opposite state of affairs obtains in FIGURE 10.

The fluid flowing above the plates 11 flows from right to left, as shown in the figures, and this flow is illustrated by the arrows $Y_1$, $Y_2$ and $Y_3$. The fluid flowing above the plates 12 flows from left to right, and this flow is illustrated by the arrows $X_1$, $X_2$ and $X_3$. It will be seen that in normal flow conditions, the flow represented by $X_1$ meets with a restriction between the crest 5 and the reduced portion 5a, and is therefore forced to divide and flow laterally between the flanks 7 so as to form part of the adjacent flows $X_2$. This flow then meets with a similar restriction between the troughs 6 and the reduced depth trough portion 6a and is again forced to divide between the two adjacent flows $X_3$. In similar manner, the flow for the other fluid, as indicated by the arrows $Y_1$, $Y_2$ and $Y_3$ is continually subdividing and reuniting. This form of flow has a tendency towards disturbing the boundary layer, and is therefore conducive to good heat transfer through the plates.

It is also possible, within the scope of the invention to have a compromise form of embodiment wherein two of the surfaces defining the flow chambers, i.e. the individual zones through which the flow paths pass, are generated by lines parallel with the general flow direction, and wherein the other two sides are convergent or divergent. This can be achieved by inclining or curving the reduced height or depth portions 5a and 6a while retaining them of substantially constant width as measured along the crests or troughs. Alternatively, a similar effect can be achieved by varying the width of the reduced height or depth portions while retaining their heights and depths at a constant amount.

It is further possible within the scope of the invention to provide some or all of the surfaces which define the flow chamber between adjacent co-operating zones with curvature in place of the flat walls so far described. Such curvature can be either uni-directional as is given for example by the surface of a cylinder, or multi-directional as given for example by the surface of an ellipsoid. Apart from varying the passage shape through the flow chamber a degree of curvature also has the desirable effect of exposing surfaces 5 and 5a, 6 and 6a, to permit fluid flow across these surfaces to the betterment of heat transfer whilst, at the same time, retaining the restrictive effect caused by the proximity of these pairs of surfaces.

Figure 11:
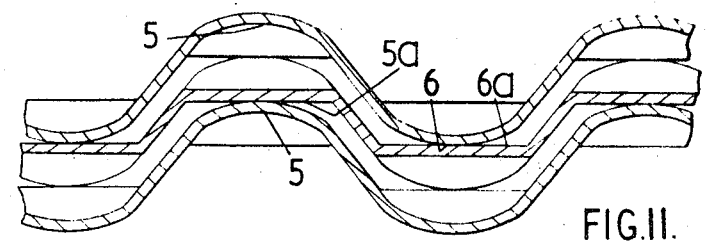
FIGURE 11 is a section of a modified form of embodiment.

Referring now to FIGURES 11 to 14, one example of such a construction is given in FIGURE 11 where surfaces 5 and 6 are curved in the same direction as the flow of fluid.

Figure 12:
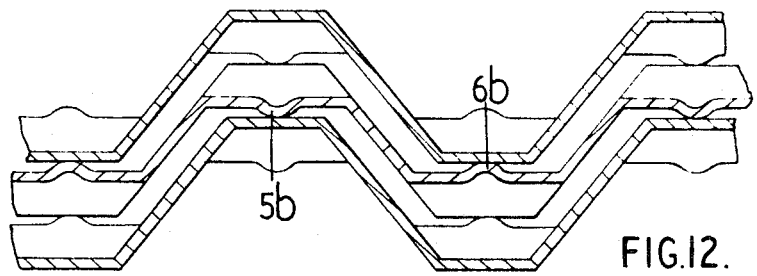
FIGURE 12 is a section of a further modified form of embodiment.

Another way of achieving a similar effect is to provide a distinctive raised portion 5b, 6b within the boundary of one of the surfaces as shown in FIGURE 12.

Figure 13:
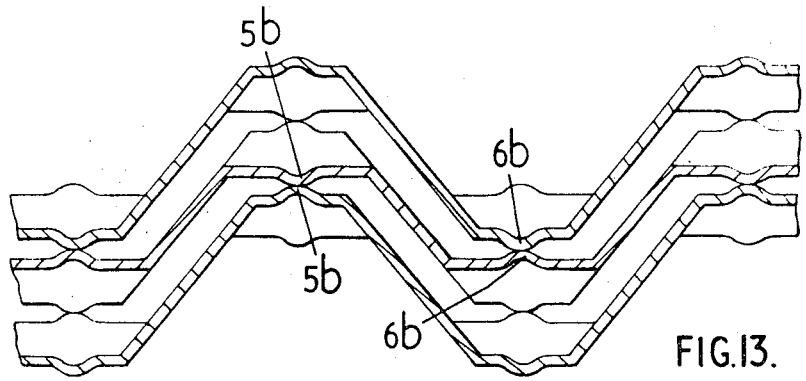
FIGURE 13 is a section of a modified form of FIGURE 12.

In FIGURE 13, raised portions 5b, 6b are provided in both co-operating surfaces.

The constructions so far described indicate that the local reductions in height and depth formed in the crests and troughs are of the same amount for adjacent plates. It is within the scope of the invention that the reduction in height or depth can be less at one part of a plate than at another part of the same plate. Normally, the reverse condition would be applied to the adjacent plate so that contact is effected between surfaces 5 and 5a, 6 and 6a.

Further, whilst it is desirable that these surfaces should contact to provide interplate support in resistance of high operating pressures it is possible that a proportion of surfaces 5a or 6a are formed at a reduced height and depth respectively as to be in sufficiently close proximity to surfaces 5 and 6 that the restriction effect is still gained, i.e. the distance between 5a and 5 at the restriction can be for example 1/10 that of the distance between 5 and 5a across the flow chamber. In this manner minimising the number of points of contact over the plate surface is achieved which is known to be beneficial for certain conditions of operation such as for example where deposition is likely to occur at the points of contact.

Figure 2:
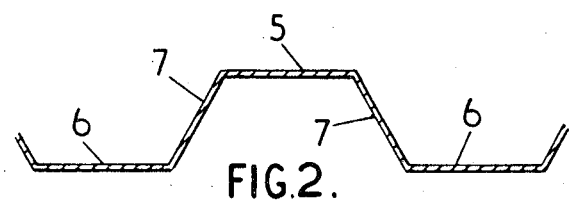
FIGURE 2 is an enlarged section on the line II—II of FIGURE 1.
Figure 14:
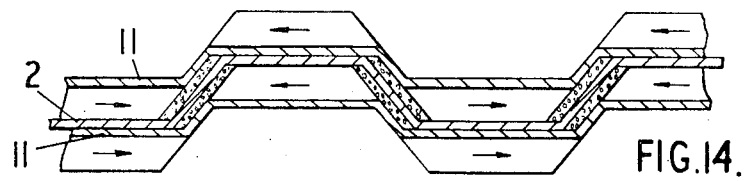
FIGURE 14 is a section of another modified form of embodiment.

FIGURE 14 shows a further alternative construction whereby it is possible to incorporate all the reduced heights and depths in one plate 11 which co-operates with an adjacent plate 2 whose construction consists of plain crests and troughs as shown in FIGURE 2.

The construction offers a further advantageous embodiment. Having manufactured the tools to produce the more complex pressings of plates 11 and 12 which when used in co-operation provide flow chambers of one size, it is a simple matter to achieve flow chambers of one half the original depth, and consequently an alteration in performance, by using plate 11 in co-operation with an adjacent plate 2.

In the foregoing the chambers formed between the crests 5 or troughs 6 have been aligned normal to the main corrugation, and displaced laterally along the main corrugation, one row from the next. It is to be understood that this is not a restrictive construction insofar as the chambers can be at some angle to the crests and troughs and that such angling applied to adjacent plates may alternate in opposite directions from the normal and by different amounts. Such angling can further cause subdivision and unification or commingling of components of the flow stream apart from that described earlier. Clearly, commingling of the streams issuing from adjacent chambers along the crest or trough of the main corrugation will occur before the total quantity of flow resolves into components entering the subsequent row of chambers as has been described.

Figure 15:
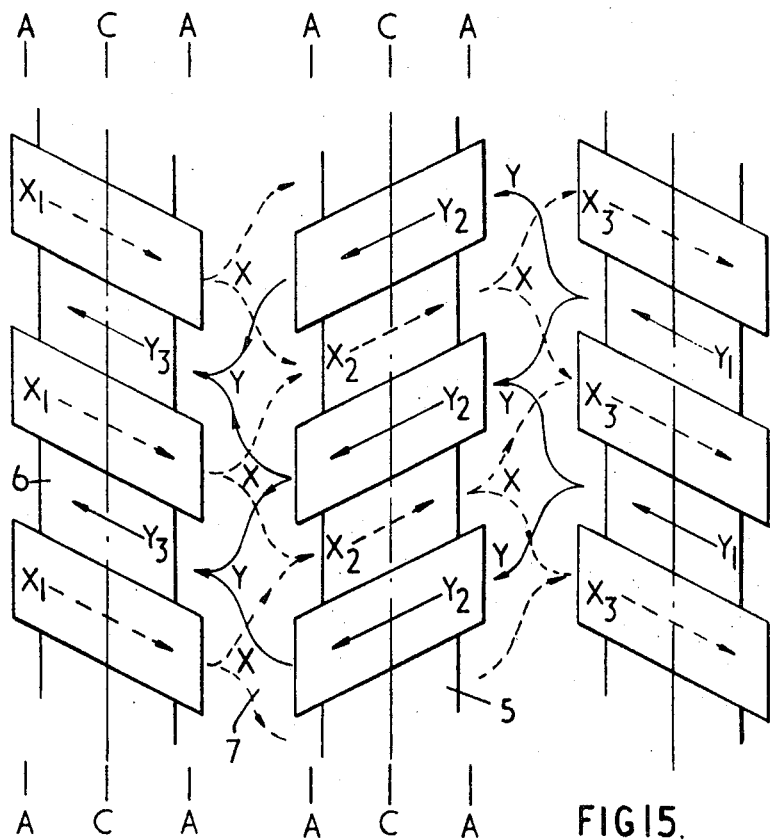
FIGURE 15 is an elevation of one modified plate.
Figure 16:
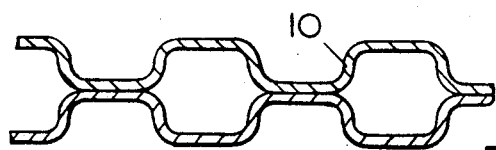
FIGURES 16 and 17 are sections on the lines A—A and C—C respectively of FIGURE 15, showing portions of two adjacent plates.
Figure 17:
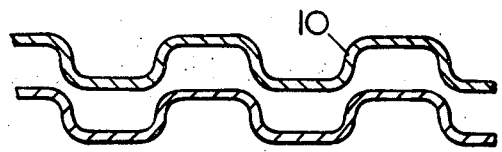

One example of angling of the chambers is given in FIGURES 15 to 17. In this construction the chambers are angled about a centre line laterally through the main corrugation whereby the flow streams entering the chambers are caused to subdivide at a plane along the centre line before dividing to emerge into the space bounded by the flanks 7 as illustrated by the change of section as between FIGURES 16 and 17.

It is to be understood that in alternative constructions the angling can be about some other centre than the lateral corrugation centre line and the chamber form can be as any of the variations previously described. Further it will be appreciated that the chamber walls 10, when angled in a different direction on one plate to those of the adjacent plate are not immediately one above the other throughout their entire surface as with those shown in FIGURES 7 and 8.

When subdivision and commingling takes place by means of angling of the walls 10, it is possible to locate the walls 10 such that the exit from one flow chamber is aligned with the entrance to the next.

As heat exchangers the constructions described may be used to exchange heat between two materials and perform processes which involve the transfer of heat from one substance to another. The quantity of heat to be transferred can be sufficient to cause a change of state physical, chemical or biological. For example, in the production of chlorine it can be required to heat or cool a liquid, namely brine, by some other media or to recover heat from outgoing spent brine which is to be transferred to fresh incoming brine. Another example of use is in cooling the chlorine gas which at the same time may contain steam which is to be condensed and removed from the gas stream. In the processing of some materials heating and evaporation is required as for example in the drying of liquid soap.

Various modifications may be made within the scope of the invention. Thus while the flow indicated by the arrows are shown in opposite directions, it is possible for the flows to be concurrent.

We claim:
1. In a plate heat exchanger comprising a pack of plates assembled in face-to-face relationship and having peripheral gaskets defining flow spaces between the plates for the passage of fluid heat exchange media, the plates having closely spaced, corrugations with crests, troughs and flanks extending generally transversely of the overall flow direction and the corrugations in adjacent plates being parallel and intermating to provide an undulating flow path in each flow space: the improvement that the crests and troughs of at least alternate plates are locally reduced in height and depth at zones spaced along the corrugations, the zones of reduced height and depth being elongated along the corrugations and cooperating with adjacent zones of the crests and troughs of the adjacent plates to present, at the said locations spaced along the corrugation, elongated restrictions to flow directly across the corrugations, and the zones of reduced height and depth being aligned, in a direction across the corrugations, with zones of normal depth and height on the adjacent troughs and crests in the same plates.

2. A plate heat exchanger as claimed in claim 1, wherein the reductions in height and depth are such that the adjacent plates contact one another to present a localised complete restriction.

3. A plate heat exchanger as claimed in claim 1, wherein the zones of reduced height or depth are of constant height or depth across the crests or troughs.

4. A plate heat exchanger as claimed in claim 1, wherein the zone of reduced height or depth is of constant width.

5. A plate heat exchanger as claimed in claim 4, wherein the zone of reduced height or depth include defining walls extending across the crests and troughs in the direction normal to the corrugations.

6. A plate heat exchanger as claimed in claim 1, wherein the zones of reduced height or depth are of varying height across the corrugations, and the variation is achieved by curvature of the surface of the crests and troughs.

7. A plate heat exchanger as claimed in claim 1, wherein the zones of reduced height and depth are of varying width and include curved walls extending across the corrugations.

8. A plate heat exchanger as claimed in claim 1, wherein the zones of reduced height or depth are spaced from the cooperating zone of the adjacent plate over a major proportion of its area, and comprising a projecting ensuring contact between the zones of reduced height or depth or the cooperating zones.

9. A plate heat exchanger as claimed in claim 1, wherein the crests and troughs of alternate plates are of uniform height and the reductions in height and depth are solely on the corrugations of the intervening plates.

10. A plate heat exchanger as claimed in claim 1, wherein the zones of reduced height and depth include lateral defining walls which are inclined at an acute angle to the longitudinal direction of the corrugations.

11. A plate heat exchanger as claimed in claim 10, in which the zones of reduced height and depth in adjacent plates cross to cause variation of the shape of the flow paths during traverse of the angled zones.

12. In a plate heat exchanger comprising a pack of plates assembled in face-to-face relationship and having peripheral gaskets defining flow spaces between the plate for the passage of fluid heat exchange media, in which each plate is formed with closely spaced corrugations having crests, troughs and flanks extending generally transversely of the overall flow direction the corrugations in adjacent plates being parallel and intermating to form undulating flow paths: the improvement that the crests and troughs of at least some of the plates are locally inclined across the corrugation over at least part of their lengths so as to extend towards one adjacent plate and away from the other adjacent plate to define therewith flow path portions of varying cross-section, the flanks of the corrugations being parallel and presenting flow paths of uniform cross-section, the flanks at the high sides of crests and low sides of troughs extending close to the adjacent plate to restrict flow at the ends of the paths of uniform cross-section.

13. A plate heat exchanger as claimed in claim 12, wherein each crest or trough is formed with local inclinations in each direction, alternating along the corrugations.

14. A plate heat exchanger as claimed in claim 12, wherein each portion of a crest or trough adjacent an inclined portion of an adjacent plate, is itself inclined in the opposite sense so as to accentuate the variation in cross-section.

15. A plate heat exchanger as claimed in claim 12, wherein the flow paths of varying cross-section further include lateral walls inclined at an acute angle with the longitudinal direction of the corrugations, so that the said flow paths are of varying width across the corrugations.

References Cited

UNITED STATES PATENTS 1,992,097  2/1935  Seligman _____ 165—167

FOREIGN PATENTS

| 151,852 | 6/1953 | Australia. |
| 548,196 | 9/1942 | Great Britain. |
| 561,314 | 5/1944 | Great Britain. |
| 562,465 | 7/1944 | Great Britain. |
| 609,719 | 10/1948 | Great Britain. |
| 821,430 | 10/1959 | Great Britain. |

ROBERT A. O'LEARY, Primary Examiner

ALBERT W. DAVIS, Assistant Examiner